United States Patent
Fujita et al.

(10) Patent No.: US 8,478,066 B2
(45) Date of Patent: Jul. 2, 2013

(54) IMAGE-CORRECTION METHOD AND IMAGE PICKUP APPARATUS

(75) Inventors: Takeo Fujita, Tokyo (JP); Narihiro Matoba, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1451 days.

(21) Appl. No.: 10/577,482

(22) PCT Filed: Oct. 31, 2003

(86) PCT No.: PCT/JP03/13972
§ 371 (c)(1),
(2), (4) Date: Apr. 27, 2006

(87) PCT Pub. No.: WO2005/043891
PCT Pub. Date: May 12, 2005

(65) Prior Publication Data
US 2008/0273812 A1 Nov. 6, 2008

(51) Int. Cl.
*G06K 9/40* (2006.01)
*H04N 9/64* (2006.01)
*H04N 5/202* (2006.01)
*H04N 1/40* (2006.01)
*G09G 1/14* (2006.01)
*G09G 3/28* (2006.01)
*G09G 5/00* (2006.01)
*G09G 5/02* (2006.01)
*G09G 5/10* (2006.01)

(52) U.S. Cl.
USPC ........... 382/274; 348/251; 348/254; 358/461; 345/20; 345/63; 345/581; 345/596; 345/690

(58) Field of Classification Search
USPC ..... 382/274; 348/251, 254; 358/461; 345/20, 345/63, 77, 581–618, 690–697
See application file for complete search history.

(56) References Cited

U.S. PATENT DOCUMENTS

| | | | | |
|---|---|---|---|---|
| 6,917,377 B2 * | 7/2005 | Aizaki et al. | | 348/79 |
| 6,937,777 B2 | 8/2005 | Shirakawa et al. | | |
| 7,907,195 B2 * | 3/2011 | Pinto et al. | | 348/251 |
| 2003/0156204 A1 * | 8/2003 | Sato et al. | | 348/222.1 |

FOREIGN PATENT DOCUMENTS

| | | |
|---|---|---|
| CN | 1366423 A | 8/2002 |
| EP | 1 292 128 A2 | 3/2003 |
| JP | 8-278155 A | 10/1996 |

(Continued)

*Primary Examiner* — Randolph I Chu
(74) *Attorney, Agent, or Firm* — Birch, Stewart, Kolasch & Birch, LLP (57) ABSTRACT

An image-correction method is realized, in which, by utilizing a table having small storage area, high-accuracy shading correction can be implemented, that does not undergo deterioration of performance, even when shading properties dynamically change.

An image-correction method according to the present invention includes a distance calculating step of calculating the distance between the coordinates of an image-constituting pixel and predetermined reference coordinates, a distance-correction value calculating step of calculating a distance-correction value, by inputting for the variable in an N-order function (N being a positive integer) the distance that has been calculated in the distance calculating step, a correction coefficient calculating step of calculating, based on a table that represents correspondences between distance-correction values and correction coefficients, a correction coefficient corresponding to the distance-correction value that has been calculated in the distance-correction value calculating step, and a pixel signal correcting step of correcting a signal for the pixel, based on the correction coefficient that has been calculated in the correction coefficient calculating step.

12 Claims, 7 Drawing Sheets

FOREIGN PATENT DOCUMENTS

| | | |
|---|---|---|
| JP | 2000-041183 A | 2/2000 |
| JP | 2000-069371 A | 3/2000 |
| JP | 2000-236480 A | 8/2000 |
| JP | 2000-304854 A | 11/2000 |
| JP | 2002-010122 A | 1/2002 |
| JP | 2002-094860 A | 3/2002 |
| JP | 2002-216136 A | 8/2002 |
| JP | 2003-087653 A | 3/2003 |
| JP | 2003-244526 A | 8/2003 |

\* cited by examiner

CORRECTION COEFFICIENT LOOK-UP TABLE

| DISTANCE CORRECTION VALUE S | CORRECTION COEFFICIENT K (FOR R PIXEL) | CORRECTION COEFFICIENT K (FOR G PIXEL) | CORRECTION COEFFICIENT K (FOR B PIXEL) |
|---|---|---|---|
| 0 | $K_{R0}$ | $K_{G0}$ | $K_{B0}$ |
| N | $K_{R1}$ | $K_{G1}$ | $K_{B1}$ |
| 2N | $K_{R2}$ | $K_{G2}$ | $K_{B2}$ |
| 3N | $K_{R3}$ | $K_{G3}$ | $K_{B3}$ |
| ⋮ | ⋮ | ⋮ | ⋮ |
| mN | $K_{Rm}$ | $K_{Gm}$ | $K_{Bm}$ |

HORIZONTAL-CORRCTION-
COEFFICIENT LOOK-UP TABLE

| HORIZONTAL-DISTANCE CORRECTION VALU $S_H$ | HORIZONTAL-CORRCTION COEFFICINT $K_H$ |
|---|---|
| 0 | $K_{H0}$ |
| $N_H$ | $K_{H1}$ |
| $2N_H$ | $K_{H2}$ |
| $3N_H$ | $K_{H3}$ |
| ⋮ | ⋮ |
| $m \cdot N_H$ | $K_{Hm}$ |

Fig. 8

VERTICAL-CORRCTION-
COEFFICINT LOOK-UP TABLE

| VERTICAL-DISTANCE CORRECTION VALU $S_V$ | VERTICAL-CORRCTION COEFFICIENT $K_V$ |
|---|---|
| 0 | $K_{V0}$ |
| $N_V$ | $K_{V1}$ |
| $2N_V$ | $K_{V2}$ |
| $3N_V$ | $K_{V3}$ |
| ⋮ | ⋮ |
| $m \cdot N_V$ | $K_{Vm}$ |

Fig. 9

IMAGE-CORRECTION METHOD AND IMAGE PICKUP APPARATUS

TECHNICAL FIELD

The present invention relates to image pickup apparatuses, and particularly to an image-correction technology, for example, for correcting unevenness (shading) in brightness and/or color in an image.

BACKGROUND ART

"Shading" that occurs in an image pickup apparatus such as a digital still camera is a phenomenon in which brightness and/or color difference (unevenness) between a central portion and a peripheral portion in a picked up picture occurs due to peripheral light-reduction in a camera optics system, distribution of the properties of a solid-state image pickup device, and the like.

An image-correction method for correcting such shading is disclosed, for example, in Japanese Laid-Open Patent Publication No. 2000-69371. In particular, the image-correction method in an image pickup apparatus disclosed in FIG. 1 in Embodiment 1 is adapted to implement shading correction, by calculating a shading-correction coefficient approximated by a two-order (an N-order) curved-surface function of the coordinates of pixels, and by multiplying an output signal from a CCD (Charge Coupled Device) by the shading-correction coefficient.

However, because, in such a conventional image-correction method, a shading-correction coefficient approximated by a two-order (an N-order) curved-surface function of the coordinates of pixels is calculated, and because shading is a phenomenon that is caused by a plurality of factors such as lens properties and sensitivity properties of a solid-state image pickup device, there is a problem in that the approximation by an N-order function may not implement the shading correction with sufficient accuracy.

In addition, an image-correction method for correcting shading is disclosed, for example, in Japanese Laid-Open Patent Publication No. 2002-216136. In particular, the image-correction method in an image pickup apparatus disclosed in FIG. 12 and Page 7 is adapted to implement shading correction, by calculating a distance between coordinates of a pixel and coordinates of a light-axis center and then taking out from a look-up table a shading-correction coefficient corresponding to the distance, and by multiplying an output signal form a CCD by the shading-correction coefficient.

However, in such a conventional image-correction method, in order to enhance the accuracy of the shading correction, a great deal of data should be held in a look-up table. Moreover, in the case where, due to combination with an optical zooming function and the like, the properties of shading dynamically varies during picking up images, changing of the data is required; therefore, there is a problem in that, more storage areas are required in order to hold alteration data, and processing time necessary for the alteration is prolonged, thereby causing deterioration in performance such as decrease in a frame rate for picking up an image.

As described above, in conventional image-correction methods, there has been a problem in that shading correction is not implemented with sufficient accuracy. In addition, in another conventional image-correction methods, there has been a problem in that, because a great deal of data is included in a look-up table, many storage areas are required in order to hold the data, thereby causing deterioration in performance.

It is an object of the present invention to solve the foregoing problems that the conventional image-correction methods possess.

DISCLOSURE OF THE INVENTION

An image-correction method according to the present invention includes a distance calculating step of calculating the distance between the coordinates of an image-constituting pixel and predetermined reference coordinates, a distance-correction value calculating step of calculating a distance-correction value, by inputting for the variable in an N-order function (N being a positive integer) the distance that has been calculated in the distance calculating step, a correction coefficient calculating step of calculating, based on a table that represents correspondences between distance-correction values and correction coefficients, a correction coefficient corresponding to the distance-correction value that has been calculated in the distance-correction value calculating step, and a pixel signal correcting step of correcting a signal for the pixel, based on the correction coefficient that has been calculated in the correction coefficient calculating step.

As described above, in the image-correction method, by inputting for the variable in an N-order function the distance between the coordinates of a pixel and predetermined reference coordinates, a distance-correction value is calculated; and based on a table that represents correspondences between distance-correction values and correction coefficients, a correction coefficient corresponding to the distance-correction value that has been calculated in the distance-correction value calculating step is calculated.

Accordingly, high-accuracy shading correction can be realized, that does not undergo deterioration of performance, even when shading properties dynamically change.

BEST MODE FOR CARRYING OUT THE INVENTION

Embodiment 1

Figure 1:
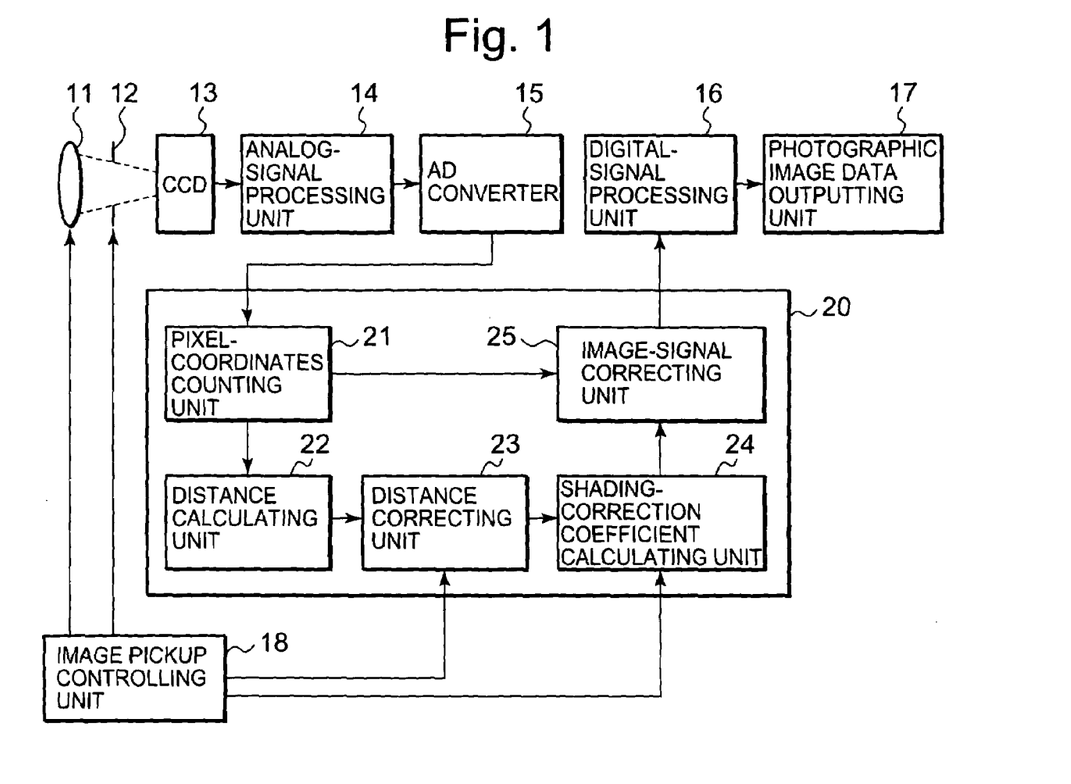
FIG. 1 is a block diagram for illustrating an image pickup apparatus according to Embodiment 1 of the present invention.

FIG. 1 is a block diagram for illustrating an image pickup apparatus according to Embodiment 1 of the present invention.

In FIG. 1, the image pickup apparatus is made up of an image pickup lens 11 having an optical zooming function, a diaphragm mechanism 12 for adjusting the amount of incident light to a camera, a CCD (Charge Coupled Device) 13 that is a photoelectric transducer, an analog-signal processing unit 14, an analog/digital converter (AD converter) 15, a digital-signal processing unit 16, an photographic image data outputting unit 17 for storing a photographic image data in a storage area, and an image pickup controlling unit 18 for controlling the optical zooming function and the diaphragm mechanism, and for changing settings for a distance correcting unit 23 and a shading-correction coefficient calculating unit 24, in a shading-correction processing section 20 described later.

Moreover, the shading-correction processing section 20 for implementing shading correction is made up of a pixel-coordinates counting unit 21 for counting the horizontal and vertical coordinates of a pixel, a distance calculating unit 22 for calculating based on the coordinates of a pixel a distance from a reference point, the distance correcting unit 23 for implementing correction of a distance value through a two-order function or an N-order function, the shading-correction coefficient calculating unit 24 for calculating a correction coefficient, based on a distance value outputted by the distance correcting unit, and an image-signal correcting unit 25 for correcting a signal level, by multiplying values for a pixel by a correction coefficient.

Next, the operation of the image pickup apparatus will be explained.

In the first place, the image pickup lens 11 forms on the CCD 13 an image made up of light from a photographic subject, through the diaphragm mechanism 12. The CCD 13 is made up of three types of pixels that are sensitive to red-color light (R), green-color light (G), and blue-color light (B), respectively; hundreds of thousands of pixels are arrayed in a matrix, each of the three types alternating with one another; the CCD 13 transduces light received by each of pixels into an electric charge and accumulates the electric charges, and then outputs as an analog signal the accumulated electric charges.

The image pickup lens 11 has an optical zooming function, and a setting value for the amount of zooming is controlled by the image pickup controlling unit 18. The stop setting for the diaphragm mechanism 12 is also controlled by the image pickup controlling unit 18.

The analog-signal processing unit 14 implements gain control, by applying double-correlated sampling to an output signal from the CCD 13. The AD converter 15 converts into a digital signal and outputs to the shading-correction processing section 20 an analog signal inputted from the analog-signal processing unit 14.

The digitalized image data is inputted to the shading-correction processing section 20. In the shading-correction processing section 20, in the first place, pixel-value data is inputted to the pixel-coordinates counting unit 21.

The pixel-coordinates counting unit 21 counts the coordinates of a pixel in a picked up frame, based on the vertical and horizontal synchronizing signals for an image, sent along with image data, and outputs the coordinate values to the distance calculating unit 22.

The distance calculating unit 22 calculates the distance between the reference point and a pixel, based on the coordinate values of the pixel and the reference point. Supposing that the coordinate values of a pixel is (x, y) and that the coordinate values of the reference point is $(x_0, y_0)$, the distance D is given by Equation (1) below:

$$D=\sqrt{(x-x_0)^2+(y-y_0)^2} \quad (1)$$

The calculated distance D is outputted to the distance correcting unit 23.

The distance correcting unit 23 implements distance-correction processing by means of an N-order function (N is a positive integer). For example, in the case where a two-order function is utilized for the distance-correction processing, the distance-correction value S is given by Equation (2) below, by utilizing the value of the distance D:

$$S=a_1 \cdot D^2 + a_2 \cdot D + a_3 \quad (2)$$

Where $a_1$, $a_2$, and $a_3$ are coefficients for the variable; by preliminarily measuring the properties of shading in an image pickup apparatus to be used, the values of the coefficients are determined so as to, along with a look-up table in the shading-correction coefficient calculating unit 24 described later, most effectively correct shading, and coefficients are stored in an unillustrated storage area. In addition, the shading-correction coefficient calculating unit 24 is designed in such a way that the values of these coefficients can be change to arbitrary values, by setting through the image pickup controlling unit 18.

Figure 2:
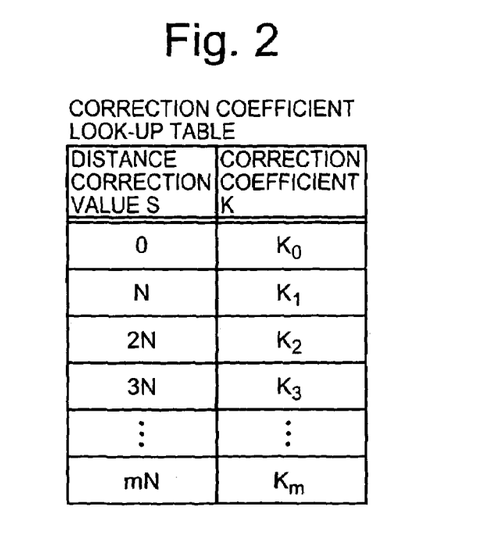
FIG. 2 is a view illustrating a look-up table of an image pickup apparatus according to Embodiment 1 of the present invention.

While referring to a distance-correction value S, the shading-correction coefficient calculating unit 24 decides a correction coefficient, based on a preliminarily set look-up table. FIG. 2 represents an example of a look-up table utilized in the shading-correction coefficient calculating unit 24. For example, in FIG. 2, by, with regard to distance-correction values S, defining (m+1) points from 0 to m×N, with a constant space N (m is a positive integer), respective correction coefficients $K_0$ to $K_m$ corresponding to the points are preliminarily determined.

Figure 3:
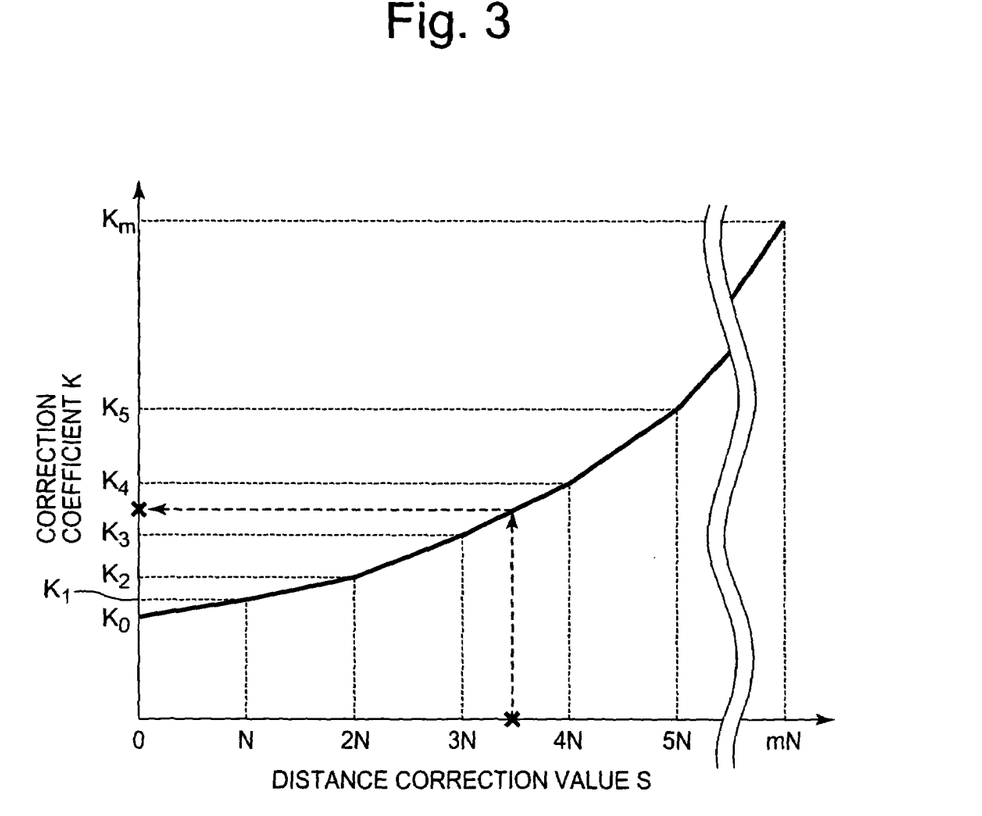
FIG. 3 is a view for explaining a relationship between a distance-correction value and a correction coefficient of an image pickup apparatus according to Embodiment 1 of the present invention.

FIG. 3 represents a method of obtaining the correction coefficient K from a distance-correction value S, by utilizing a look-up table. In FIG. 3, the abscissa indicates the distance-correction values S to be referred, and the ordinate indicates the correction coefficients K obtained with reference to the distance-correction values S. FIG. 3 is an example of the case where, as is the case with FIG. 2, (m+1) points from 0 to m×N are defined with a constant space N (m is one or a larger integer), with regard to distance-correction values S. By preliminarily measuring properties of shading in an image pickup apparatus to be used, the values in the look-up table in FIG. 2 are determined so as to, along with coefficients set in the distance correcting unit 23, most effectively correct shading, and the coefficients are stored in an unillustrated storage area. In addition, provision is made for a mechanism to be able to change the values of these coefficients to arbitrary values, by setting through the image pickup controlling unit 18.

Because an actual distance-correction value S in the shading-correction coefficient calculating unit 24 is interposed between two points among the (m+1) points from 0 to m×N, the correction coefficient is determined through a linear interpolation based on the distance-correction values and the correction coefficients for the two points closest to the distance-correction value S. In the case where a distance-correction value S meets the conditional equation, i.e., t·N≦S<(t+1)·N, the correction coefficient K is given by Equation (3) below.

$$K = K_t + (K_{(t+1)} - K_t) \times \frac{S - t \cdot N}{N} \quad (3)$$

In Embodiment 1, it is described that the correction coefficient is determined through a linear interpolation; however, the method of deciding the correction coefficient is not limited to the linear-interpolation method.

The calculated correction coefficient K is outputted to the image-signal correcting unit 25.

In the image-signal correcting unit 25, by utilizing as a magnification the correction coefficient K, and by multiplying the signal level for a pixel by the correction coefficient K, the corrected signal level is obtained. The photographic image data to which the correction through the correction coefficient K has been applied with regard to each pixel is outputted to the digital-signal processing unit 16.

The digital-signal processing unit 16 applies processing, such as white balance adjustment, defective-pixel correction, color (R, G, and B)-signal interpolation, gamma correction, and color conversion, to an output signal from the CCD 13 that has been digitized by the AD converter 15 and has been corrected by the shading-correction processing section 20, thereby creating image data including a brightness signal and a color-difference signal.

The photographic image data outputting unit 17 implements processes such as storing image data in a storage area and displaying image data on a liquid crystal screen for checking an image.

The image pickup controlling unit 18 controls an optical zooming function that is included in the image pickup lens 11 and a diaphragm mechanism 12. In the case where the optical zooming function or the diaphragm mechanism is changed, the properties of the optical system change, whereby the properties of created shading change. Thus, the image pickup controlling unit 18 changes settings for the distance correcting unit 23 and the shading-correction coefficient calculating unit 24, based on settings for the image pickup lens and the optical zooming.

As a method of changing setting, there are three methods, i.e., changing only coefficients for the distance correcting unit 23, changing only data in a look-up table utilized in the shading-correction coefficient calculating unit 24, and changing both the coefficients for the distance correcting unit 23 and the data in the shading-correction coefficient calculating unit 24.

In the case where change in the properties of the optical system is not complex, it is possible to address the change in the properties of shading, by changing only the coefficients for the distance correcting unit 23. In this case, it is not necessary to change data in the shading-correction coefficient calculating unit 24 that includes a great deal of data; therefore, the amount of settings to be changed in response to the change in the properties of shading can be restricted to a minimal necessary amount. In particular, changing the optical zooming or the stop setting is very likely to be dynamically implemented during picking up of an image; therefore, it is conceivable that changing of data for shading correction is implemented for each picked up frame. In this situation, due to a small amount of change in settings, shading correction that is able to quickly follow changes in the properties of the optical system can be realized.

Normally, in order to address the changing of optical-zooming setting and diaphragm setting, the properties of shading that occurs with each of optical-zooming settings to be utilized and with each of diaphragm settings to be utilized should be measured, and data for correcting shading, corresponding to the properties, should be held as updating data in a storage area. However, if there is an operational condition under which it is possible to change settings, by merely changing the coefficients for the distance correcting unit 23, the amount of the data to be held as updating parameters in the storage area can be reduced.

In the case where change in the properties of the optical system is complex, it is necessary to address the change in the properties of shading, by means of change that includes changing of the data in the shading-correction coefficient calculating unit 24. In this case, the capability of high-speed tracking in response to the change in the optical system slightly decreases; however, more accurate shading correction can be implemented.

It is also possible to always utilize either one of the foregoing two types of methods of changing shading-correction settings, depending on the properties of the optical system; moreover, the two types of methods each can be selectively utilized, depending on an operational mode, for example, in the case of moving-image pickup that requires high-speed tracking, the change in the properties of shading may be addressed by means of changing of settings for the distance correcting unit 23, and in the case of still-image pickup that requires accuracy, the change in the properties of shading may be addressed by means of changing of settings for the shading-correction coefficient calculating unit 24.

As described heretofore, in the image pickup apparatus according to Embodiment 1 of the present invention, the correction of a distance from a reference point, by means of a two-order function or an N-order function, and the calculation of a correction coefficient, by utilizing a look-up table are combined. In consequence, an effect is demonstrated, in which it is possible to realize an image pickup apparatus that can implement high-accuracy shading correction and that can quickly follow the dynamic change in the properties of shading, caused by changing of settings for the optical zooming or the diaphragm.

Moreover, because the amount of data that should be held for carrying out the changing of settings for the optical zooming and the diaphragm can be suppressed to a small amount, an effect is demonstrated, in which the capacity of a storage area necessary for holding the data can be reduced.

Embodiment 2

In Embodiment 1 described above, a configuration is disclosed, in which shading correction is applied in the same way to all pixels, without considering color components of a pixel. However, in some cases, due to the properties of a micro lens for focusing a light beam to each pixel of a solid-state image pickup device and the like, shading whose respective properties for each color component differ can be observed. A configuration, in the case where, in order to address these cases, different shading correction is applied to each color component, will be described below.

Figure 4:
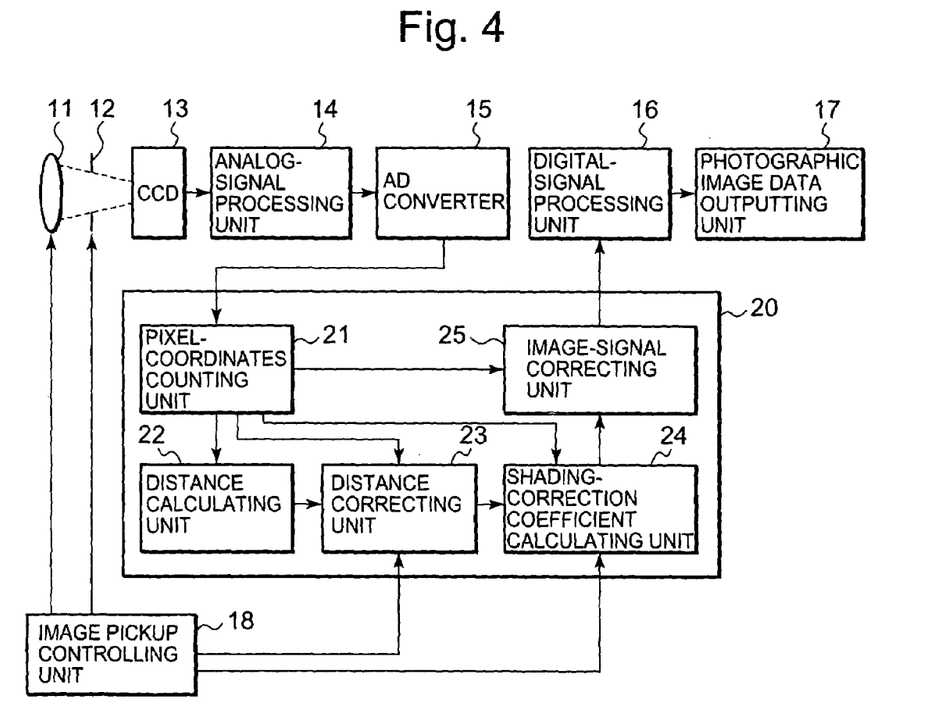
FIG. 4 is a block diagram for illustrating an image pickup apparatus according to Embodiment 2 of the present invention.

FIG. 4 is a block diagram for illustrating an image pickup apparatus according to Embodiment 2 of the present invention. The same reference marks in FIG. 4 indicate the same or equivalent constituent elements.

In FIG. 4, the image pickup apparatus is made up of an image pickup lens 11 having an optical zooming function, a diaphragm mechanism 12 for adjusting the amount of incident light to a camera, a CCD (Charge Coupled Device) 13 that is a photoelectric transducer, an analog-signal processing unit 14, an analog/digital converter (AD converter) 15, a digital-signal processing unit 16, a photographic image data outputting unit 17 for storing a photographic image data in a storage area, and an image pickup controlling unit 18 for controlling the optical zooming function and the diaphragm mechanism, and for changing settings for a distance correcting unit 23 and a shading-correction coefficient calculating unit 24, in a shading-correction processing section 20 described later.

Moreover, the shading-correction processing section 20 for implementing shading correction is made up of a pixel-coordinates counting unit 21 for counting the horizontal and vertical coordinates of a pixel and for discriminating the color of a pixel, a distance calculating unit 22 for calculating based on the coordinates of a pixel a distance from a reference point, the distance correcting unit 23 for implementing correction of a distance value through a two-order function or an N-order function, the shading-correction coefficient calculating unit 24 for calculating a correction coefficient, based on a distance-correction value outputted by the distance correcting unit, and an image signal correcting unit 25 for correcting a signal level, by multiplying values for a pixel by a correction coefficient.

Next, the operation of the image pickup apparatus will be explained.

The image pickup lens 11, the diaphragm mechanism 13, the analog-signal processing unit 14, an AD converter 15, the digital-signal processing unit 16, and the photographic image data outputting unit 17 implement the same operation as that in Embodiment 1.

The pixel-coordinates counting unit 21 counts the coordinates of a pixel in a picked up frame, based on the vertical and horizontal synchronizing signals for an image, sent along with image data, and determines, based on the arrangement of pixels in the CCD, which color among R, G, and B the image data is for. The pixel-coordinates counting unit 21 outputs the counted coordinate values to the distance calculating unit 22, and outputs color information for the pixel, to each of distance calculating unit 22, the distance correcting unit 23, and the shading-correction coefficient calculating unit 24.

The distance calculating unit 22 calculates the distance between the reference point and a pixel, based on the coordinate values of the pixel and the reference point. The method of calculating the distance D is the same as that in Embodiment 1; however, the method is utilized with the reference point being switched depending on which color among R, G, and B the pixel data is for. Supposing that the coordinate values of a pixel is (x, y) and that the coordinate values of an R reference point, a G reference point, and a B reference point are $(x_R, y_R)$, $(x_G, y_G)$, and $(x_B, y_B)$, respectively, the distances D for an R pixel, a G pixel, and a B pixel are given according to Equation (4), (5), and (6), respectively.

$$D=\sqrt{(x-x_R)^2+(y-y_R)^2} \quad (4)$$

$$D=\sqrt{(x-x_G)^2+(y-y_G)^2} \quad (5)$$

$$D=\sqrt{(x-x_B)^2+(y-y_B)^2} \quad (6)$$

The calculated distance D is outputted to the distance correcting unit 23.

The distance correcting unit 23 implements distance-correction processing by means of an N-order function (N is a positive integer). For example, in the case where a two-order function is utilized for the distance-correction processing, the distance-correction values S are given by Equation (7) to (9) below, by utilizing the values of the distances D:

$$S=a_{R1} \cdot D^2+a_{R2} \cdot D+a_{R3} \quad (7)$$

$$S=a_{G1} \cdot D^2+a_{G2} \cdot D+a_{G3} \quad (8)$$

$$S=a_{B1} \cdot D^2+a_{B2} \cdot D+a_{B3} \quad (9)$$

Equation (7), (8), and (9) are applied to an R pixel, a G pixel, and a B pixel, respectively. The characters $a_{R1}$, $a_{R2}$, $a_{R3}$, $a_{G1}$, $a_{G2}$, $a_{G3}$, $a_{B1}$, $a_{B2}$, and $a_{B3}$ are coefficients, for the variable, whose values are determined, by preliminarily measuring properties of shading in an image pickup apparatus to be used, so as to, along with a look-up table in the shading-correction coefficient calculating unit 24 described later, correct shading most effectively, and the coefficients are stored in an unillustrated storage area. In addition, provision is made for a mechanism to be able to change the values of these coefficients to arbitrary values, by setting through the image pickup controlling unit 18.

While referring to a distance-correction value S, the shading-correction coefficient calculating unit 24 decides the correction coefficient, based on a preliminarily set look-up table.

Figure 5:
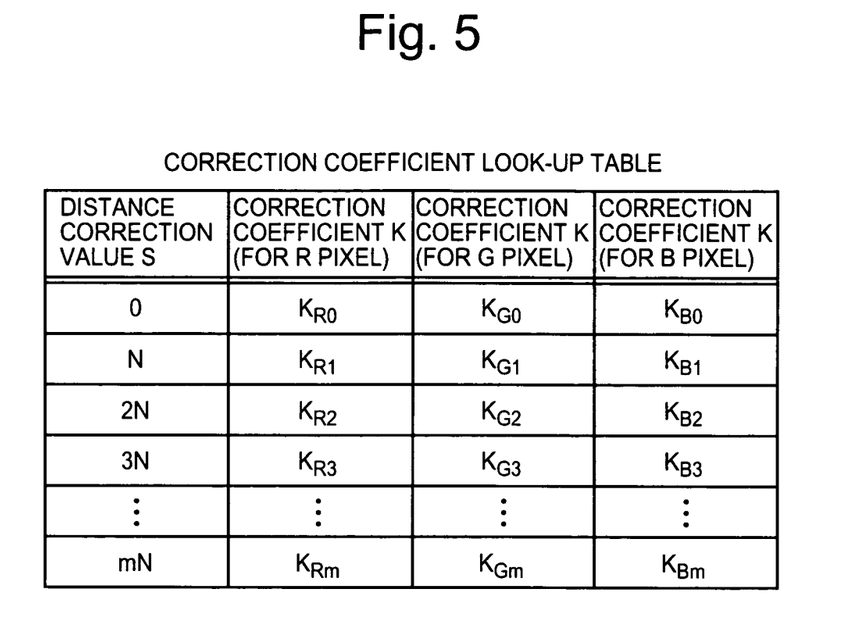
FIG. 5 is a view illustrating a look-up table of an image pickup apparatus according to Embodiment 2 of the present invention.

The method of deciding a correction coefficient, based on a look-up table, is the same as that in Embodiment 1; the correction coefficient is determined through a linear interpolation based on the distance-correction values and the correction coefficients for the two points, among points defined through the look-up table, whose distance-correction values are closest to the calculated distance-correction value S. However, depending on which color among R, G, and B pixel data is for, the look-up table to be referred to is switched. FIG. 5 represents an example of a look-up table utilized in the shading-correction coefficient calculating unit 24. In contrast to a look-up table in FIG. 2, according to Embodiment 1, the correction coefficients corresponding to distance-correction values S are each separated into an R-pixel coefficient from $K_{R0}$ to $K_{Rm}$, a G-pixel coefficient from $K_{G0}$ to $K_{Gm}$, and a B-pixel coefficient from $K_{B0}$ to $K_{Bm}$, thereby being enabled to be independently set.

After preliminarily measuring the properties of shading in an image pickup apparatus to be used, the values in the look-up table in FIG. 5 are determined so as to, along with coefficients set in the distance correcting unit 23, most effectively correct shading, and the values are stored in an unillustrated storage area. In addition, provision is made for a mechanism to be able to change the values of these coefficients to arbitrary values, by setting through the image pickup controlling unit 18.

The method of deciding a horizontal correction coefficient, based on a look-up table, is the same as that in Embodiment 1; the correction coefficient is determined through a linear interpolation based on the distance-correction values and the correction coefficients for the two points, among points defined through the look-up table, whose distance-correction values are closest to the calculated distance-correction value S. The horizontal correction coefficient K calculated with reference to the look-up table is outputted to the image-signal correcting unit 25.

In the image-signal correcting unit 25, as is the case with Embodiment 1, by utilizing as a magnification the correction coefficient K, and by multiplying the signal level of for pixel by the correction coefficient K, the corrected signal level is obtained. The photographic image data to which the correction with regard to each pixel through the correction coefficient K has been applied is outputted to the digital-signal processing unit 16.

The image pickup controlling unit 18 controls an optical zooming function that is included in the image pickup lens 11 and a diaphragm mechanism 12, and changes, based on the settings for the image pickup lens and the optical zooming, settings for the distance correcting unit 23 and the shading-correction coefficient calculating unit 24, in order to respond to the change in the properties of shading. Because each setting value is separated, corresponding to each of colors R, G, and B, when the setting is changed, it is necessary to change all the respective settings corresponding to an R component, a G component, and a B component.

The foregoing image pickup apparatus according to Embodiment 2 implements correction, by discriminating among an R pixel, a G pixel, and a B pixel, and setting a shading-correction reference point, coefficients for a distance correcting function, and a look-up table, independently for pixels for each color; therefore, an effect is demonstrated in which high-accuracy shading correction can be implemented, even when, due to the properties of a micro lens for focusing a light beam to each pixel of a solid-state image pickup device and the like, shading whose respective properties for each color differ are observed.

Embodiment 3

In Embodiments 1 and 2, the distance between a reference point and a pixel position is obtained, and then a correction coefficient is calculated, based on the distance value. However, the calculation of a distance includes a second-order calculation and a square-root calculation, with regard to a pixel position; therefore, a relatively large calculation circuitry is required. A configuration, for reducing the amount of calculation required to implement shading correction and for implementing shading correction with a less amount of calculation, will be described below.

Figure 6:
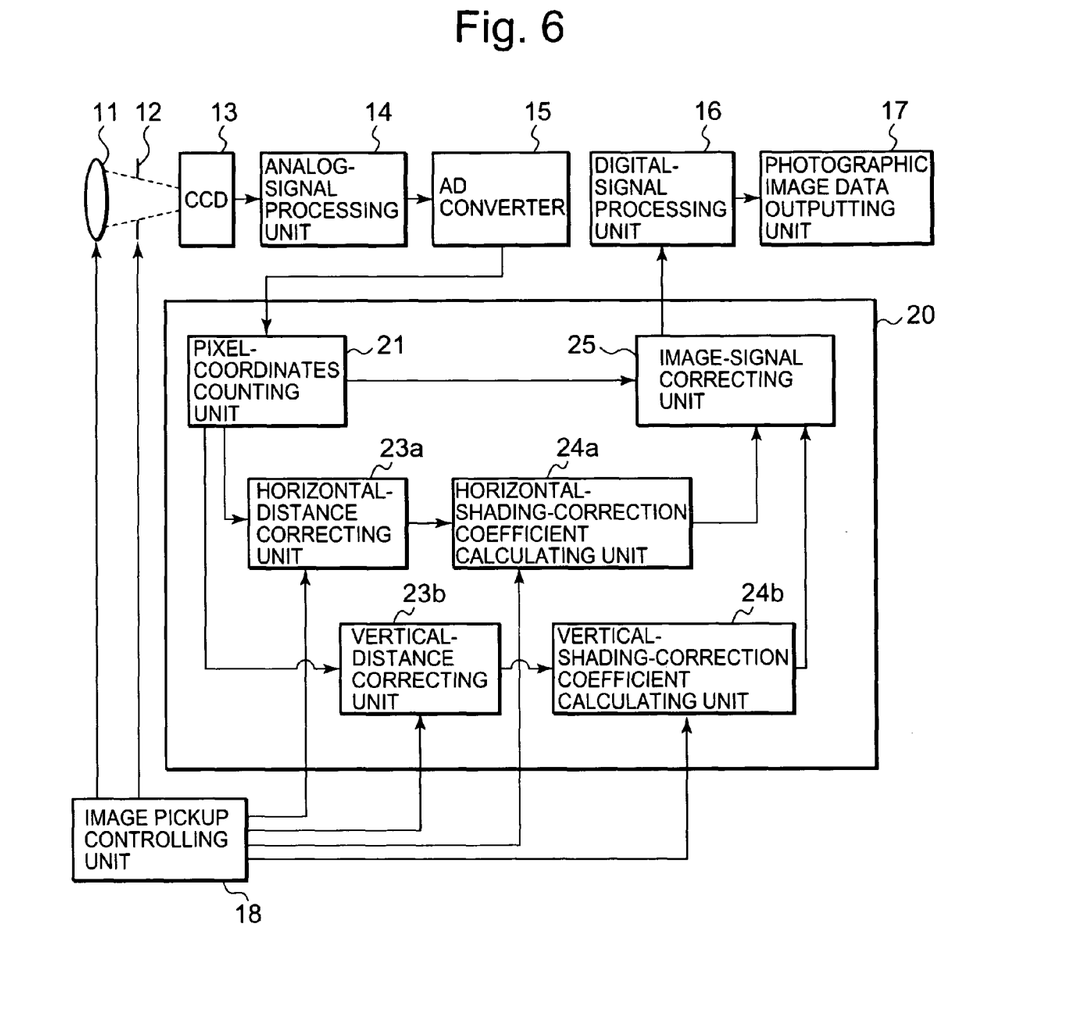
FIG. 6 is a block diagram for illustrating an image pickup apparatus according to Embodiment 3 of the present invention.

FIG. 6 is a block diagram for illustrating an image pickup apparatus according to Embodiment 3 of the present invention. In FIG. 6, the same reference marks indicate the same or equivalent constituent elements.

In FIG. 6, the image pickup apparatus is made up of an image pickup lens 11 having an optical zooming function, a diaphragm mechanism 12 for adjusting the amount of incident light to a camera, a CCD (Charge Coupled Device) 13 that is a photoelectric transducer, an analog-signal processing unit 14, an analog/digital converter (AD converter) 15, a digital-signal processing unit 16, an photographic image data outputting unit 17 for storing a photographic image data in a storage area, and an image pickup controlling unit 18 for controlling the optical zooming function and the diaphragm mechanism, and for changing settings for a horizontal-distance correcting unit 23a, a vertical-distance correcting unit 23b, a horizontal-shading-correction coefficient calculating unit 24a, and a vertical-shading-correction coefficient calculating unit 24b, in a shading-correction processing section 20 described later.

The shading-correction processing section 20 for implementing shading correction is made up of a pixel-coordinates counting unit 21 for counting the horizontal and vertical coordinates of a pixel, the horizontal-distance correcting unit 23a for calculating based on the horizontal coordinate of a pixel the horizontal distance from a reference point, and for implementing correction of a horizontal-distance value through a two-order function or an N-order function, the vertical-distance correcting unit 23b for calculating based on the vertical coordinate of a pixel the vertical distance from the reference point, and for implementing correction of a vertical-distance value through a two-order function or an N-order function, the horizontal-shading-correction coefficient calculating unit 24a for calculating a horizontal correction coefficient, based on a horizontal distance value outputted by the horizontal-distance correcting unit 23a, the vertical-shading-correction coefficient calculating unit 24b for calculating a vertical correction coefficient, based on a vertical distance value outputted by the vertical-distance correcting unit 23a, and an image-signal correcting unit 25 for correcting a signal level, by multiplying values for a pixel by a horizontal correction coefficient and a vertical correction coefficient.

Next, the operation of the image pickup apparatus will be explained.

The image pickup lens 11, the diaphragm mechanism 13, the analog-signal processing unit 14, an AD converter 15, the digital-signal processing unit 16, and the photographic image data outputting unit 17 implement the same operation as that in Embodiment 1.

The pixel-coordinates counting unit 21 counts the coordinates of a pixel in a picked up frame, based on the vertical and horizontal synchronizing signals for an image, sent along with image data. The pixel-coordinates counting unit 21 outputs to the horizontal-distance calculating unit 23a the horizontal pixel value out of the counted coordinate values, and outputs to the vertical-distance calculating unit 23b the vertical pixel value out of the counted coordinate values.

The horizon-distance calculating unit 23a firstly calculates a horizontal distance between the reference point and a pixel, based on the horizontal coordinate values of the pixel and the reference point. Supposing that the coordinate values of the pixel is (x, y) and that the coordinate values of the reference point is $(x_0, y_0)$, the horizontal distance $D_H$ is given by Equation (10) below:

$$D_H = \tilde{x} - x_0 \quad (10)$$

In addition, the horizontal-distance correcting unit 23a implements horizontal distance correction processing by means of an N-order function (N is a positive integer). For example, in the case where a two-order function is utilized for the correction processing, the horizontal-distance correcting value SH is given by Equation (11) below, by utilizing the value of the horizontal distance $D_H$:

$$S_H = a_1 \cdot D_H^2 + a_2 \cdot D_H + a_3 \quad (11)$$

Where $a_1$, $a_2$, and $a_3$ are coefficients for variables in the function, whose values are determined, by preliminarily measuring properties of shading in an image pickup apparatus to be used, so as to, along with setting values in the horizontal-shading-correction coefficient calculating unit 24a, the vertical-distance correcting unit 23b, and the vertical-shading-correction coefficient calculating unit 24b, which are described later, correct shading most effectively, and the coefficients are stored in an unillustrated storage area. In addition, provision is made for a mechanism to be able to change the values of these coefficients to arbitrary values, by setting through the image pickup controlling unit 18.

The calculated distance $S_H$ is outputted to the horizontal-shading-correction coefficient calculating unit 24a.

Figure 7:
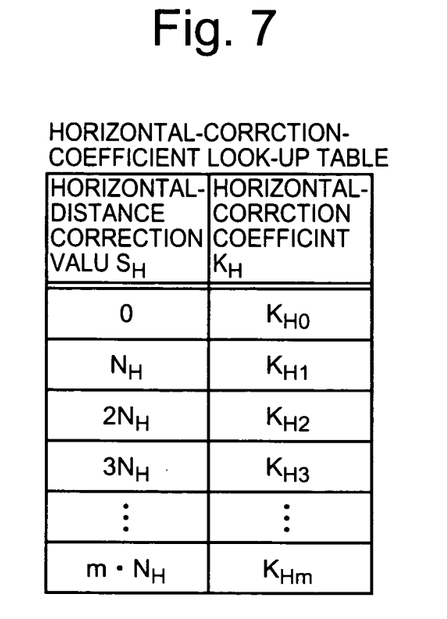
FIG. 7 is a view illustrating a look-up table of an image pickup apparatus according to Embodiment 3 of the present invention.

By referring to a distance-correction value $S_H$, the shading-correction coefficient calculating unit 24 determines the correction coefficient, based on a preliminarily set look-up table. FIG. 7 represents an example of a look-up table utilized in the horizontal-shading-correction coefficient calculating unit 24a; by, with regard to horizontal-distance correcting values SH, defining (m+1) points from 0 to m×$N_H$, with a constant space $N_H$ (m is a positive integer), respective correction coefficients $K_{H0}$ to $K_{Hm}$ corresponding to the points are preliminarily determined.

After preliminarily measuring the properties of shading in an image pickup apparatus to be used, the values in the look-up table in FIG. 7 are determined so as to, along with setting values in the horizontal-distance correcting unit 23a, the vertical-distance correcting unit 23b, and the vertical-shading-correction coefficient calculating unit 24b, most effectively correct shading, and the values are stored in an unillustrated storage area. In addition, provision is made for a mechanism to be able to change the values of these coefficients to arbitrary values, by setting through the image pickup controlling unit 18.

The method of determining a horizontal correction coefficient, based on a look-up table, is the same as that in Embodiment 1; the horizontal correction coefficient is determined through a linear interpolation based on the horizontal-distance correcting values and the horizontal correction coefficients for the two points, among points defined through the look-up table, whose horizontal-distance correcting values are closest to the calculated horizontal-distance correcting value $S_H$. The horizontal correction coefficient $K_H$ calculated with reference to the look-up table is outputted to the image-signal correcting unit 25.

The vertical-distance correcting unit 23b firstly calculates a vertical distance between the reference point and the pixel, based on the vertical coordinate values of the pixel and the reference point. Supposing that the coordinate values of a pixel is (x, y) and that the coordinate values of the reference point is $(x_0, y_0)$, the vertical distance $D_V$ is given by Equation (12) below:

$$D_V = y - y_0 \qquad (12)$$

In addition, the vertical-distance correcting unit 23b implements vertical distance correction processing by means of an N-order function (N is a positive integer). For example, in the case where a two-order function is utilized for the distance-correction processing, the vertical-distance correcting value SV is given by Equation (14) below, by utilizing the value of the distance $D_V$:

$$S_V = b_1 \cdot D_V^2 + b_2 \cdot D_V + b_3 \qquad (13)$$

Where $b_1$, $b_2$, and $b_3$ are coefficients, for variables in the function, whose values are determined, by preliminarily measuring properties of shading in an image pickup apparatus to be used, so as to, along with setting values in the horizontal-distance correcting unit 23a, horizontal-shading-correction coefficient calculating unit 24a, and the vertical-shading-correction coefficient calculating unit 24b, and the vertical-shading-correction coefficient calculating unit 24b described later, correct shading most effectively, and the coefficients are stored in an unillustrated storage area. In addition, provision is made for a mechanism to be able to change the values of these coefficients to arbitrary values, by setting through the image pickup controlling unit 18.

The calculated distance $S_V$ is outputted to the vertical-shading-correction coefficient calculating unit 24b.

Figure 8:
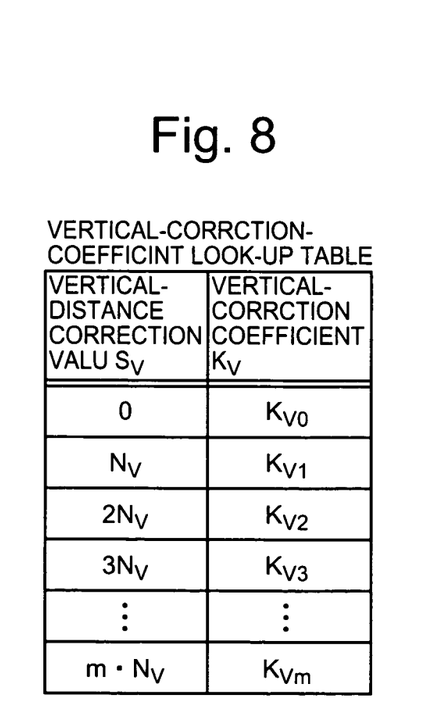
FIG. 8 is a view illustrating a look-up table of an image pickup apparatus according to Embodiment 3 of the present invention.

By referring to a vertical-distance correcting value SV, the vertical-shading-correction coefficient calculating unit 24b determines the correction coefficient, based on a preliminarily set look-up table. FIG. 8 represents an example of a look-up table utilized in the vertical-shading-correction coefficient calculating unit 24b; by, with regard to vertical-distance correcting values $S_V$, defining (m+1) points from 0 to m×$N_V$, with a constant space $N_V$ (m is a positive integer), respective correction coefficients $K_{V0}$ to $K_{Vm}$ corresponding to the points are preliminarily determined.

By preliminarily measuring the properties of shading in an image pickup apparatus to be used, the values in the look-up table in FIG. 8 are determined so as to, along with setting values in the horizontal-distance correcting unit 23a, the horizontal-shading-correction coefficient calculating unit 24a, and the vertical-distance correcting unit 23b, most effectively correct shading, and are stored in an unillustrated storage area. In addition, provision is made for a mechanism to be able to change the values of these coefficients to arbitrary values, by setting through the image pickup controlling unit 18.

The method of determining based on a look-up table a vertical correction coefficient is the same as that in Embodiment 1; the vertical correction coefficient is determined through a linear interpolation based on the vertical-distance correcting values and the vertical correction coefficients for the two points, among points defined through the look-up table, whose vertical-distance correcting values are closest to the calculated vertical-distance correcting value $S_V$. The vertical correction coefficient $K_V$ calculated with reference to the look-up table is outputted to the image-signal correcting unit 25.

In the image-signal correcting unit 25, by utilizing as magnifications the horizontal correction coefficient $K_H$ and the vertical correction coefficient $K_V$, and by multiplying the signal level for a pixel by the horizontal correction coefficient $K_H$ and the vertical correction coefficient $K_V$, a corrected signal level is obtained. The photographic image data to which the correction through the correction coefficients $K_H$ and $K_V$ has been applied with regard to each pixel is outputted to the digital-signal processing unit 16.

The image pickup controlling unit 18 controls the optical zooming function that is included in the image pickup lens 11 and a diaphragm mechanism 12, and changes, based on the settings for the image pickup lens and the optical zooming, settings for the horizontal-distance correcting unit 23a, the horizontal-shading-correction coefficient calculating unit 24a, the vertical-distance correcting unit 23b, and the vertical-shading-correction coefficient calculating unit 24b, in order to respond to the change in the properties of shading.

As is the case with Embodiment 1, with regard to the change of distance correcting coefficients and the change of parameters for the look-up table, provision is made for implementing either one or both of the changes, depending on the nature of change in the properties of the optical system and on the required tracking performance of shading correction for the change in the properties of the optical system In addition, in Embodiment 3, the case is described, in which shading correction is applied in the same way to all pixels, without considering color components of a pixel; however, as is the case with the relationship of Embodiment 2 with Embodiment 1, by holding three types each of settings for the horizontal-distance correcting unit 23a, the horizontal-shading-correction coefficient calculating unit 24a, the vertical-distance correcting unit 23b, and the vertical-shading-correction coefficient calculating unit 24b, and by switching the types of settings, depending on which color among R, G, and B the pixel data is for, shading correction that differs for each color component can be implemented.

The foregoing image pickup apparatus according to Embodiment 3 does not implement second-order calculation and a square-root calculation as the calculation of the distance between a pixel and the reference point, but calculates respective correction coefficients that independently correspond to the horizontal and vertical positions of a pixel, and applies the coefficients in such a way as to multiply one of the coefficients by another; therefore, the amount of calculation required to implement shading correction is reduced, whereby an effect can be demonstrated, in which shading correction can be implemented with a less amount of calculation.

Embodiment 4

In Embodiments 1 and 2, by defining only one reference point, the distance between the coordinates of a pixel and the reference point is obtained through the calculation of distance with respect to a circle. However, in the case where the accuracy in mounting the optical system in an image pickup apparatus is not sufficient, the axis of the optical system and the image pickup plane of the solid-state image pickup device are not perpendicular to each other, whereby the properties of emerging shading may not necessarily be symmetrical with respect to the center of the light axis. Also in the case where the accuracy in processing lenses is not sufficient, it is possible that shading that is asymmetrical with respect to the center of the light axis occurs. In order to address such a case as this, a configuration will be described, in which, by setting two reference points to calculate distances and by calculating the distances with respect to an ellipse, the distance between the coordinates of a pixel and the reference points is obtained.

As is the case with Embodiment 1, the block diagram for Embodiment 4 is illustrated in FIG. 1; however, only the operation of the distance calculating unit 22 in the shading-correction processing section 20 is different from that in Embodiment 1.

Here, the operation of the distance calculating unit 22 in the shading-correction processing section 20, according to Embodiment 4 will be explained.

The distance calculating unit 22 calculates the distance between the reference points and a pixel, based on the coordinate values of the pixel and the two reference points. Supposing that the coordinate values of the pixel is (x, y) and that the coordinate values of the reference point 1 and the reference point 2 are $(x_1, y_1)$ and $(x_2, y_2)$, respectively, the distance D is given by Equation (14) below:

$$D = \sqrt{(x-x_1)^2 + (y-y_1)^2} + \sqrt{(x-x_2)^2 + (y-y_2)^2} \quad (14)$$

The calculated distance D is outputted to the distance correcting unit 23.

Figure 9:
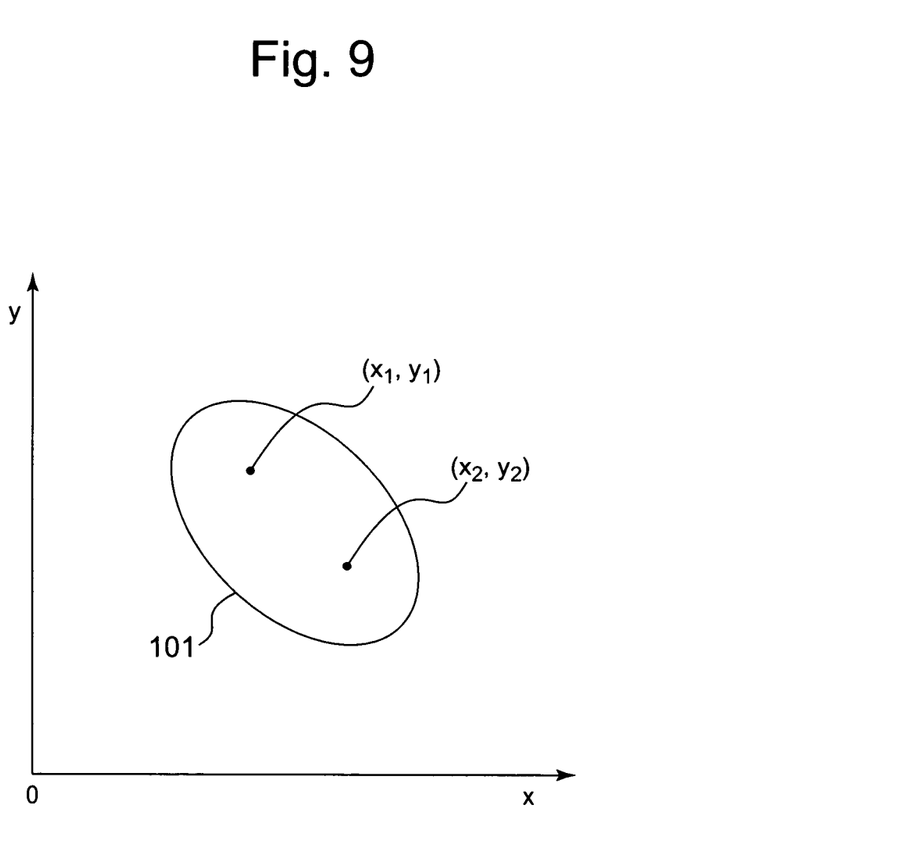
FIG. 9 is a view for explaining a relationship between distance and two reference coordinates of an image pickup apparatus according to Embodiment 4 of the present invention.

FIG. 9 represents the distribution of pixel coordinates that give the same calculated distance, in the case where a distance is calculated by utilizing two reference points. As represented in FIG. 9, by providing two reference points, and by regarding, as the distance between the coordinates of a pixel and a reference point, the sum of the distance between the coordinates of that pixel and the one reference point, and the distance between the coordinates of that pixel and the other reference point, the coordinates of pixels having the same calculated distance configure ellipse-like distribution 101 having two focuses that are the two reference points.

Accordingly, by, based on the distance D calculated as described above, calculating a distance-correction value, as is the case with Embodiment 1, and by calculating a correction coefficient, while utilizing a look-up table, the same correction coefficients also configure ellipse-like distribution having two focuses that are the two reference points; therefore, by regarding the midpoint of the two reference points as the center, shading correction can be implemented, in which the distribution of correction coefficients differs, depending on the orientation from the center.

In addition, in Embodiment 4, the case is described, in which shading correction is applied in the same way to all pixels, without considering color components of a pixel; however, as is the case with the relationship of Embodiment 2 with Embodiment 1, by holding three types each of settings for the distance calculating unit 22, the distance correcting unit 23, and the shading-correction coefficient calculating unit 24, and by switching the types of settings, depending on which color among R, G, and B the pixel data is for, shading correction that differs for each color component can be implemented.

By providing two reference points utilized to calculate distances, by regarding, as the distance between the coordinates of a pixel and a reference point, the sum of the distance between the coordinates of that pixel and the one reference point, and the distance between the coordinates of that pixel and the other reference point, and by regarding the midpoint of the two reference points as the center, the foregoing image pickup apparatus according to Embodiment 4 implements shading correction in which the distribution of correction coefficients differs, depending on the orientation from the center; therefore, even when the properties of emerging shading are not symmetrical with respect to the center of the light axis, an effect is demonstrated in which high-accuracy shading correction can be implemented.

Embodiment 5

Above embodiments have been described, by regarding as circuitry the shading-correction processing section 20 and the like; however, these may be realized through software processing. In other words, a configuration may be employed, in which a computer equipped with a central processing unit having a general-purpose function implements a predetermined processing through computer programs.

INDUSTRIAL APPLICABILITY

As described heretofore, the image-correction method according to the present invention is useful for correcting shading in brightness and/or color in images, of image pickup apparatuses such as a still camera. However, the application is not limited to image pickup apparatuses. For example, the image-correction methods according to the present invention can be applied to other image processing units used for implementing predetermined processing for images.

What is claimed is:

1. An image-correction method for correcting an image obtained by a solid-state image pickup device of an image pick-up apparatus, comprising:
a distance calculating step of calculating, by utilizing a distance calculating unit, a distance between the coordinates of an image-constituting pixel obtained by said solid-state image pickup device and predetermined reference coordinates;
a distance-correction value calculating step of receiving the calculated distance as an input variable of an N-order function having a plurality of coefficients for the input variable, and calculating a distance-correction value as an output value of the N-order function, N being a positive integer greater than or equal to 2;
a correction coefficient calculating step of calculating, based on a preliminarily set table that represents correspondences between distance-correction values and correction coefficients, a correction coefficient corresponding to the calculated distance-correction value;
a pixel signal correcting step of correcting a signal for the pixel based on the calculated correction coefficient; and
an updating step of updating distance-correction values by individually changing the coefficients for the input variable in said N-order function in the distance-correction value calculating step in response to change in optical settings including setting of a diaphragm mechanism and setting of an optical zooming function of an optical system of said image pick-up apparatus, said optical system directing light onto said solid-state image pickup device.

2. The image-correction method according to claim 1, wherein said correction coefficient calculating step includes calculating the correction coefficient corresponding to the calculated distance-correction value, by, based on the preliminary set table, linear interpolation using distance-correction-value data and correction-coefficient data that are stored in the preliminary set table.

3. The image-correction method according to claim 1, wherein the reference coordinates in the distance calculating step, the coefficients for the variable in the N-order function in the distance-correction value calculating step, and the distance-correction values and correction coefficients stored in the table in the correction coefficient calculating step can be determined for each color component of the pixel.

4. The image-correction method according to claim 1, comprising a distance calculating step of calculating the distance, by regarding as the distance the sum of the distance between the coordinates of a pixel corresponding to an image signal and the one of two sets of predetermined reference coordinates, and the distance between the coordinates of the pixel and the other of two sets of predetermined reference coordinates.

5. An image-correction method, comprising:
a horizontal-direction distance calculating step of calculating the horizontal-direction distance between the coordinates of an image-constituting pixel and predetermined reference coordinates;
a horizontal-direction distance-correction value calculating step of calculating a horizontal-direction distance-correction value, by inputting for the variable in a first N-order function (N being a positive integer) the horizontal-direction distance that has been calculated in the horizontal-direction distance calculating step;
a first correction coefficient calculating step of calculating, based on a first table that represents correspondences between horizontal-direction distance-correction values and first correction coefficients, a first correction coefficient corresponding to the horizontal-direction distance-correction value that has been calculated in the horizontal-direction distance-correction value calculating step;
a vertical-direction distance calculating step of calculating the vertical-direction distance between the coordinates of an image-constituting pixel and predetermined reference coordinates;
a vertical-direction distance-correction value calculating step of calculating a vertical-direction distance-correction value, by inputting for the variable in a second N-order function (N being a positive integer) the vertical-direction distance that has been calculated in the vertical-direction distance calculating step;
a second correction coefficient calculating step of calculating, based on a second table that represents correspondences between vertical-direction distance-correction values and second correction coefficients, a second correction coefficient corresponding to the vertical-direction distance-correction value that has been calculated in the vertical-direction distance-correction value calculating step; and
a pixel signal correcting step of correcting a signal for the pixel, based on the first correction coefficient that has been calculated in the first correction coefficient calculating step and on the second correction coefficient that has been calculated in the second correction coefficient calculating step an updating step of updating distance-correction values by individually changing the coefficients for the input variable in said first N-order function in the horizontal-direction distance-correction value calculating step and said second N-order function in the vertical-direction distance-correction value calculating step in response to change in optical settings including setting of a diaphragm mechanism and setting of an optical zooming function of an optical system of said image pick-up apparatus, said optical system directing light onto said solid-state image pickup device.

6. An image pickup apparatus, comprising:
a solid-state image pickup device;
an optical system that directs light onto said solid-state image pickup device;
a distance calculating unit that calculates a distance between the coordinates of an image-constituting pixel obtained by said solid-state image pickup device and predetermined reference coordinates;
a distance-correction value calculating unit that receives the calculated distance as an input variable of an N-order function having a plurality of coefficients for the input variable and calculates a distance-correction value as an output value of the N-order function, N being a positive integer greater than or equal to 2;
a correction coefficient calculating unit that calculates, based on a preliminarily set table that represents correspondences between distance-correction values and correction coefficients, a correction coefficient corresponding to the distance-correction value that has been calculated by the distance-correction value calculating unit; a pixel signal correcting unit that corrects a signal for the pixel based on the correction coefficient that has been calculated by the correction coefficient calculating unit; and
a control unit that updates distance-correction values by individually changing the coefficients for the input variable in said N-order function in the distance-correction value calculating unit in response to change in optical settings including setting of a diaphragm mechanism and setting of an optical zooming function of said optical system.

7. The image pickup apparatus according to claim 6, wherein said correction coefficient calculating unit calculates the correction coefficient corresponding to the distance-correction value that has been calculated in the distance-correction value calculating unit, by, based on the preliminary set table, linear interpolation using distance-correction-value data and correction-coefficient data that are stored in the preliminary set table.

8. The image pickup apparatus according to claim 6, wherein the reference coordinates in the distance calculating unit, the coefficients for the variable in the N-order function in the distance-correction value calculating unit, and the distance-correction values and correction coefficients stored in the table in the correction coefficient calculating unit can be determined for each color component of the pixel.

9. The image pickup apparatus according to claim 6, comprising a distance calculating unit for calculating the distance, by regarding as the distance the sum of the distance between the coordinates of a pixel corresponding to an image signal and the one of two sets of predetermined reference coordinates, and the distance between the coordinates of the pixel corresponding to the image signal and the other of two sets of predetermined reference coordinates.

10. An image pickup apparatus, comprising:
a horizontal-direction distance calculating means for calculating the horizontal-direction distance between the coordinates of an image-constituting pixel and predetermined reference coordinates;
a horizontal-direction distance-correction value calculating means for calculating a horizontal-direction distance-correction value, by inputting for the variable in a first N-order function (N being a positive integer) the horizontal-direction distance that has been calculated in the horizontal-direction distance calculating means;
a first correction coefficient calculating means for calculating, based on a first table that represents correspondences between horizontal-direction distance-correction values and first correction coefficients, a first correction coefficient corresponding to the horizontal-direction distance-correction value that has been calculated in the horizontal-direction distance-correction value calculating means;
a vertical-direction distance calculating means for calculating the vertical-direction distance between the coordinates of an image-constituting pixel and predetermined reference coordinates;
a vertical-direction distance-correction value calculating means for calculating a vertical-direction distance-correction value, by inputting for the variable in a second N-order function (N being a positive integer) the vertical-direction distance that has been calculated in the vertical-direction distance calculating means;
a second correction coefficient calculating means for calculating, based on a second table that represents correspondences between vertical-direction distance-correction values and second correction coefficients, a second correction coefficient corresponding to the vertical-direction distance-correction value that has been calculated in the vertical-direction distance-correction value calculating means; and
a pixel signal correcting means for correcting a signal for the pixel, based on the first correction coefficient that has been calculated in the first correction coefficient calculating means and on the second correction coefficient that has been calculated in the second correction coefficient calculating means a control unit that updates distance-correction values by individually changing the coefficients for the input variable in said first N-order function in the horizontal-direction distance-correction value calculating unit and said second N-order function in the vertical-direction distance-correction value calculating unit in response to change in optical settings including setting of a diaphragm mechanism and setting of an optical zooming function of said optical system.

11. The image-correction method according to claim 1, wherein with regard to change of the coefficients of the N-order function and change of parameters for the preliminarily set table, said updating step implements either one or both of the changes, depending on a nature of change in properties of the image pick-up apparatus and on required tracking performance of correction for the change in the properties of the image pick-up apparatus.

12. The image pickup apparatus according to claim 6, wherein with regard to change of the coefficients of the N-order function and change of parameters for the preliminarily set table, said control unit implements either one or both of the changes, depending on a nature of change in properties of the image pick-up apparatus and on required tracking performance of correction for the change in the properties of the image pick-up apparatus.

* * * * *